United States Patent [19]

Morinaga

[11] 4,310,129
[45] * Jan. 12, 1982

[54] SEAT BELT RETRACTOR WITH EMERGENCY LOCKING MECHANISM

[75] Inventor: Masaru Morinaga, Yamato, Japan

[73] Assignee: NSK-Warner K.K., Tokyo, Japan

[ * ] Notice: The portion of the term of this patent subsequent to Nov. 17, 1998, has been disclaimed.

[21] Appl. No.: 123,726

[22] Filed: Feb. 22, 1980

Related U.S. Application Data

[63] Continuation-in-part of Ser. No. 105,141, Dec. 19, 1979.

[30] Foreign Application Priority Data

Feb. 26, 1979 [JP] Japan .................. 54/23895[U]

[51] Int. Cl.³ .................. A62B 35/02; B65H 75/48
[52] U.S. Cl. ................................. 242/107.4 B
[58] Field of Search .............. 242/107.4 R–107.4 E; 280/806–808; 297/478, 480

[56] References Cited

U.S. PATENT DOCUMENTS

| | | | |
|---|---|---|---|
| 3,991,953 | 11/1976 | Takada | 242/107.4 B X |
| 4,168,810 | 9/1979 | Sack et al. | 242/107.4 B X |
| 4,228,970 | 10/1980 | Morinaga | 242/107.4 B X |

Primary Examiner—John M. Jillions
Attorney, Agent, or Firm—Cantor and Singer

[57] ABSTRACT

A seat belt retractor provided with an emergency locking mechanism comprises a seat belt retractor body having right and left side plates and a retractor shaft, first and second locking means, a support member having therein pawls adapted to be engaged with said first locking means and a retaining member which are integrally secured to one end of said retractor shaft, a plate mounted on said retaining member such that it is turnable together with said retaining member but is movable relative thereto and a pawl member which is rockingly mounted on said plate for restraint thereof. This seat belt retractor also includes a weight plate adapted to detect an abrupt acceleration of a webbing and designed such that it performs a delayed rotation, by the inertia thereof, with respect to said retaining member when the acceleration of the webbing caused by changes in the extracting speed thereof exceeds a predetermined value.

4 Claims, 4 Drawing Figures

SEAT BELT RETRACTOR WITH EMERGENCY LOCKING MECHANISM

CROSS-REFERENCE TO RELATED APPLICATION

This application is a continuation-in-part of my copending application Ser. No. 105,141, filed Dec. 19, 1979.

FIELD OF THE INVENTION

The present invention relates to a seat belt retractor adapted for use in a motor vehicle, and more particularly to a seat belt retractor provided with an emergency locking mechanism for fastening the driver or passenger when the vehicle moves with a speed change exceeding a predetermined value.

BACKGROUND OF THE INVENTION

There are already proposed various seat belt retractors provided with such emergency locking mechanisms, but such retractors require complicated and expensive parts with an increased number of associated parts in order to render the operation of the locking mechanism precise and secure.

In the prior art of the emergency locking mechanism there are proposed and already in actual use two types of locking mechanisms, one being operable by sensing or detecting the acceleration or deceleration of the vehicle through the extracting acceleration of a webbing as disclosed in the U.S. Pat. No. 3,489,799 and the other being a locking mechanisms operable by direct detection of the acceleration or deceleration of the vehicle with the use of an inertial displacement member such as a pendulum as disclosed in the U.S. Pat. No. 3,758,044. In order to provide more reliable locking of the seat belt retractor, there is also proposed and used a retractor provided with the above-mentioned two types of locking mechanisms as disclosed in the U.S. Pat. No. 4,083,511. However, incorporation of such complicated locking mechanism results in an increased number of associated parts, thus rendering the entire retractor larger and, hence, costly.

SUMMARY OF THE INVENTION

It is therefore a main object of the present invention to provide a novel seat belt retractor of a simplified construction which comprises a relatively limited number of associated parts, but ensures satisfactory operation.

Another object of the present invention is to provide an improved seat belt retractor which is provided with an emergency locking mechanism operable by detection of retracting or withdrawl acceleration of a webbing.

These objects are achieved by a seat belt retractor comprising a seat belt retractor body having right and left side plates, a first locking internal tooth means provided on the periphery of an opening in said left side plate, a support member having therein pawls adapted to be engaged with said first locking means and a retaining member which are integrally secured to one end of a retractor shaft, a ratchet plate mounted on said retaining member such that it is turnable together with said retaining member but is movable relative to said retaining member, a paul member which is rockingly mounted on said ratchet plate for restraint thereof, a weight plate mounted rotatably on a shaft of said retaining member and adapted to detect an accidentally abrupt acceleration of a webbing, and a cover having therein a second locking internal tooth means which is engaged with said pawl member.

Other objects and features will become fully apparent from the following description taken in conjunction with the accompanying drawings.

Figure 1:
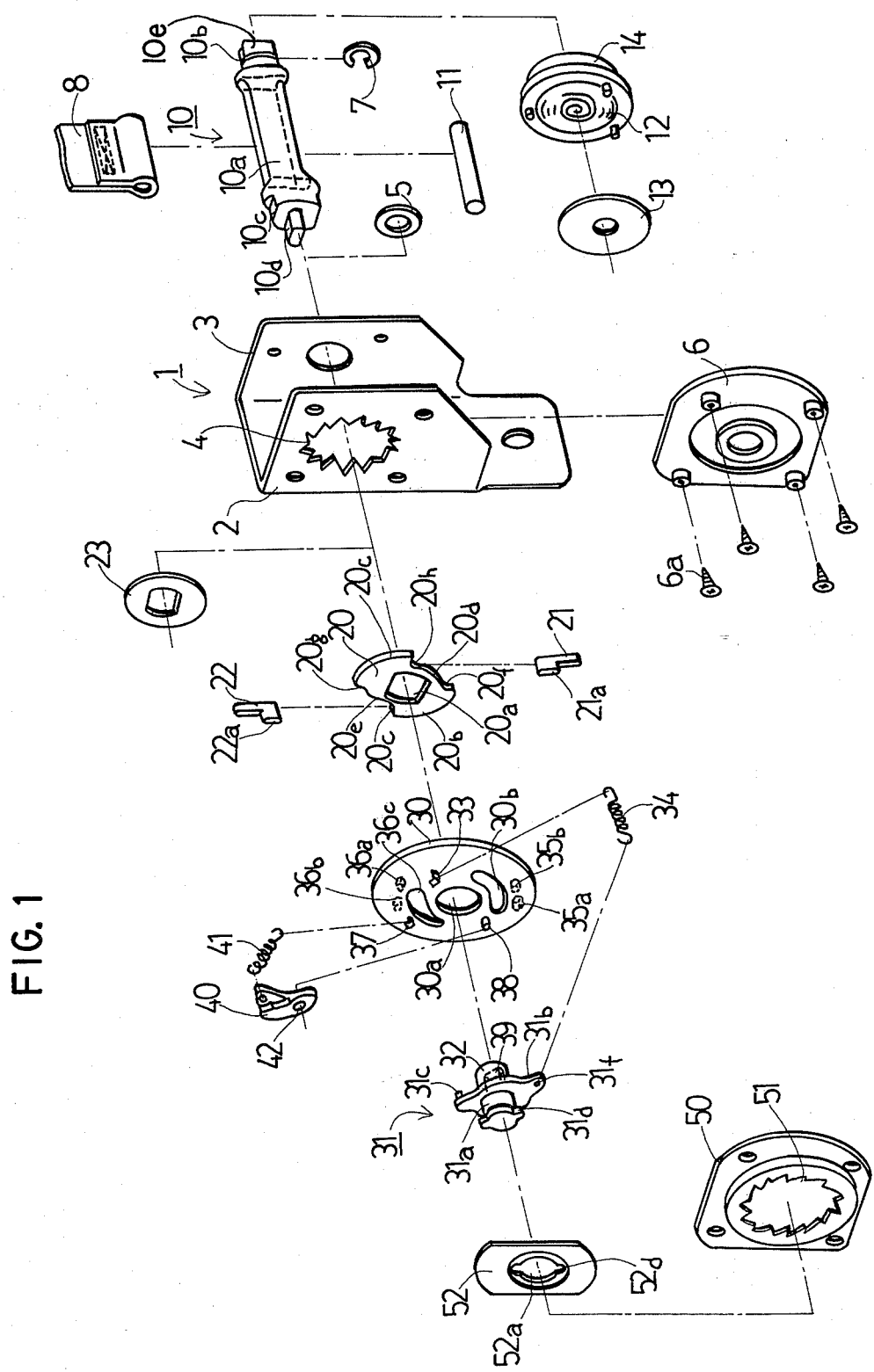
FIG. 1 is an exploded view showing the respective parts of a seat belt retractor according to the present invention.

Referring now to the drawings, reference numeral 1 generally designates a retractor body; and 2 and 3 side plates thereof. A retractor shaft generally shown at 10 is provided between the side plates 2 and 3. The right end of the retractor shaft 10 is mounted on the side plate 3 with its circumferential groove 10b being fitted with a washer 7. The left end of the retractor shaft 10 has upper and lower flat surfaces which form a locking portion 10c. A locking end portion 10d extends axially from the left end portion of the retractor shaft 10, and has a flat surface at the end. A bushing 5 is fitted over the locking end portion 10d. The side plate 2 has an opening through which the shaft 10 is extended, and the periphery of the opening is formed with a first locking internal tooth means 4. The locking portion 10c is positioned in the internal tooth means 4 through the bushing 5. A slot 10a diverging downwardly is formed in the retractor shaft 10, into which a shaft 11 is to be inserted. The diameter of the shaft 11 is larger than the smaller width of the slot 10a and smaller than the larger width of the slot 10a. One end portion of a webbing 8 is folded and sewed to form a bag-shaped ring into which the shaft 11 is inserted. Thereafter, the webbing 8 is passed through the slot 10a, so that the webbing 8 may not be removed from the slot 10a and accordingly the retractor shaft 10. A slit 10e is formed in the right end portion of the shaft 10 and is coupled to one end of a take-up spring 12 built in a cover 14. Thus, the retractor shaft 10 is biased by the spring 12 so that it is always turnable in the take-up direction (counterclockwise in the drawings).

Figure 2:
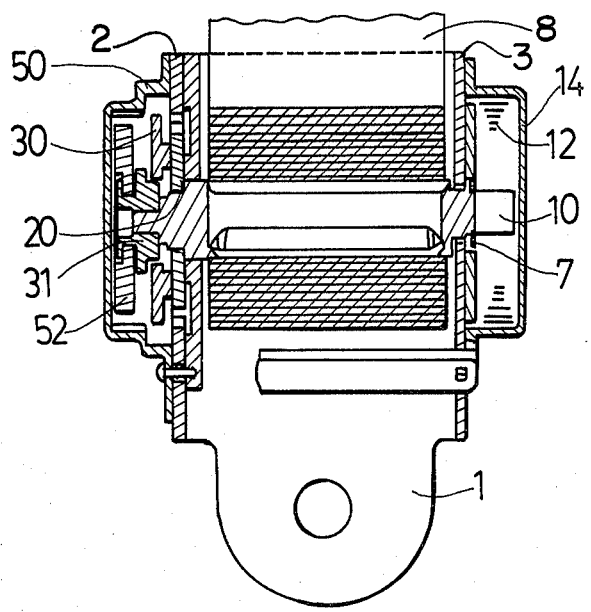
FIG. 2 is a sectional view taken along a plane including a retractor shaft in the central portion of the assembled seat belt retractor.

The locking portion 10c, at the left end portion, of the shaft 10 is inserted into the opening in the side plate 2 the periphery of which forms the aforementioned first locking internal tooth means 4 of the side plate 2. An internal retaining plate 6 is mounted on the inside of the side plate 2 with screws 6a. A supporting member 20 has arcuate edges 20b and 20c with the maximum diameter being smaller than the inside diameter of the first locking internal tooth means 4. The supporting member 20 has cutouts 20d and 20e on both sides. Pawls 21 and 22 are fitted in the cutouts 20d and 20e, respectively. A disc 23 is integrally mounted on the right side of the supporting member 20 so that the internal retaining plate 6 is not brought into slide contact with the pawls. A plate 30 having a central hole 30a is fixedly secured to the left side of the supporting member with a retaining member 31 which is provided on the left side of the plate 30. As shown in the sectional view of FIG. 2, a shaft 32 extending from the right side of the retaining member 31 passes through the central hole 30a of the plate 30. A hole 39 is formed in the shaft 32. The locking end portion 10d of the retractor shaft 10 is fitted into the hole 39. Pins 31b and 31c extending from both ends of the retaining member 31 are inserted into slots 30b and 30c formed in the plate 30, so that the plate 30 is rotatably movable relative to the retaining member 31 with the extent of movement being limited by slots 30b and 30c. A pin 33 on the left side of the plate 30 is coupled through a spring 34 into a hole 31f in the retaining member 31, so that the plate 30 is pulled clockwise with respect to the retaining member. Pins 35a, 35b, 36a and 36b are provided on the right side of the plate 30. The inner end of an extension 21a of the pawl 21 is in contact with the pin 31b, and the top end thereof is placed between the pins 35a and 35b. Similarly, the inner end of an extension 22a of the pawl 22 is in contact with the pin 31c, and the top end thereof is placed between the pins 36a and 36b. The pawls 21 and 22 are rotatably received in the edges 20h and 20i of the cutouts 20d and 20e at the fixed ends, respectively. A pawl member 40 is provided on the left side of the plate 30. A pin 38 on the left side of the plate 30 is inserted into a hole 42 in the pawl member 40, and a spring 41 is provided between a pin 37 on the left side of the plate 30 and the pawl member 40, so that the pawl member 40 is biased clockwise at all times. A weight plate 52 is engaged with the left shaft 31a of the retaining member. More specifically, the shaft 31a with extensions 31d is inserted into a central hole 52a with recesses 52d of the retaining member, and then the weight plate is a slightly turned, as a result of which the extensions 31d retain the weight plate. Thus, the weight plate 52 is positively engaged with the shaft 31a of the retaining member. The central hole 52a of the weight plate is rotatably engaged with the shaft 31a of the retaining member, and normally the weight plate is turnable with the retaining member. A cover 50 incorporating a second locking internal tooth means 51 is provided on the left side of the weight plate. The cover 50 is mounted through the side plate 2 on the internal retaining member 6 with the screws 6a.

Figure 3:
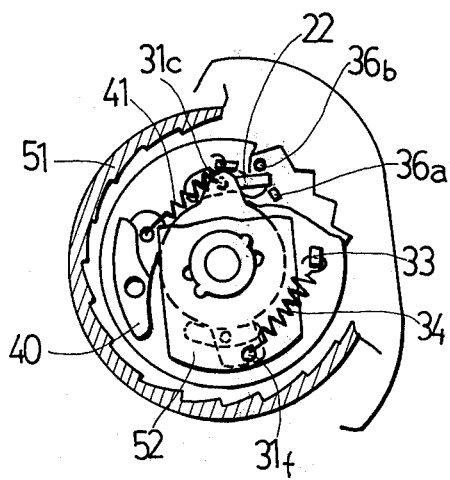
FIG. 3 is a side view of the assembled seat belt retractor (as viewed from the left hand side in FIG. 1) which is in the unlocking position.

As the seat belt retractor according to the present invention is constructed as described above, when the retractor shaft is rotated to wind or unwind the webbing, then the supporting member 20 engaged with the locking portion 10c and the retaining member 31 engaged with the locking end portion 10d are rotated as one unit, simultaneously with rotation of the plate 30 secured through the spring 34 to the retaining member and the weight plate 52 engaged with the shaft 31a of the retaining member are also rotated. As was described before, the plate 30 and the weight plate 52 are turnable relative to the retaining member 31. Thus, the plate 30 makes relative rotation with the aid of the spring 34; however, its further relative rotation is limited because the pin 35a is abutted against the edge 20f of the cutout 20d of the supporting member while the pin 36a is abutted against the edge 20g similarly. Normally, the pawls 21 and 22 guided by being inserted between the pins 35a and 35b and between the pins 36a and 36b respectively are held at non-locking positions, i.e. the positions in the cutouts 20d and 20e, respectively, as shown in FIG. 3.

Upon occurrence of abnormal conditions such as the collision of the vehicle and an emergency stop, the human body is abruptly moved forwardly by inertia, as a result of which the belt is also abruptly pulled. In order to prevent this trouble, it is necessary to lock the seat belt winding mechanism.

For this purpose, the weight plate 52 is provided to detect an acceleration which causes an abrupt change in the withdrawal speed of the webbing, thereby to lock the plate 30.

Figure 4:
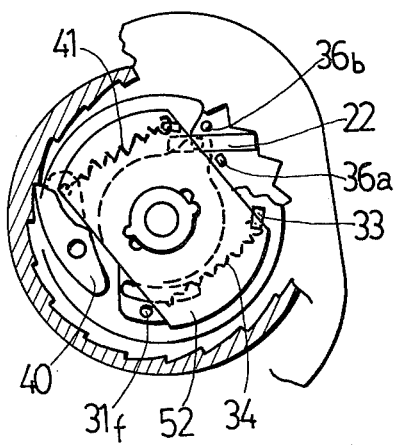
FIG. 4 is a side view of the assembled seat belt retractor in the locked position.

When the acceleration reaches a predetermined value, the weight plate 52 cannot follow the abrupt speed change because of its inertia; that is, the rotating speed of the weight plate 52 is lower than that of the retaining member 31. Accordingly, the weight plate 52 turns counterclockwise relative to the retaining member, as shown in FIG. 4. As a result, the pawl member 40 is pushed outside against the elastic force of the spring 41, whereupon the pawl member 40 is engaged with the second locking internal tooth means 51 in the cover 51, thus locking the plate 30. Under this condition, the retractor shaft 10 is turned in the withdrawal direction of the webbing (or clockwise). Therefore, the plate 30 is turned against the elastic force of the spring 34 relative to the supporting member 20 and the retaining member 31 which are turned together with the winding shaft. The end portions of the pawls 21 and 22 which are inserted between the pins 35a and 35b and between the pins 36a and 36b on the plate, respectively, are guided thereby, on the other hand. Accordingly, the pawls are moved outwardly and are engaged with the first locking internal tooth means 4 in the side plate 2 as is clear from FIG. 4 which is a side view of the seat belt winding device in the locking state. The pawls are, on the other hand, engaged with the edges 20h and 20i of the cutouts 20d and 20e of the supporting member 20. Therefore, when the pawls are engaged with the first locking internal tooth means 4, the rotation of the supporting member 20 is stopped and the rotation of the retractor shaft 10 integral therewith is also stopped.

The seat belt winding device of the present invention thus constructed comprises a limited number of necessary components and has a dual locking mechanism. Thus, the present invention provides a locking mechanism which operates positively in the case of emergency such as collision.

I claim:

1. A seat belt retractor having an emergency locking mechanism, comprising a seat belt retractor body having right and left side plates, each having an opening therein, and a retractor shaft rotatably mounted therebetween and extending therethrough; a first locking means provided on the periphery of said opening in said left side plate; a support member having therein pawls adapted to be engaged with said first locking means to lock said retractor shaft when in their engaged position, and a retaining member which are integrally secured to the left end of said retractor shaft; a plate mounted on said retaining member such that it is turnable together with said retaining member but is movable to a limited extent relative thereto; means for moving said pawls into locking engagement with said first locking means when said support member is moved relative to said plate; a pawl member which is rockingly mounted on said plate; one end of a seat belt webbing being fixed to said retractor shaft; a detecting means adapted to detect an abrupt acceleration of said webbing; and a cover having therein a second locking means whereby when there is an abrupt acceleration of said webbing, said detecting means causes said last mentioned pawl member to engage said second locking means, thereby locking said plate, further rotation of said shaft causing said support member to move relative to said plate and to cause subsequent movement of said first mentioned pawls into engagement with said first locking means, therefore locking said shaft.

2. The seat belt retractor as recited in claim 1, in which said first and second locking means comprise internal tooth means.

3. The seat belt retractor as recited in claim 1, in which said detecting means includes a weight plate rotatably mounted on a shaft of said retaining member which is turnable together therewith in the normal state.

4. The seat belt retractor as recited in claim 3, in which said weight plate is designed such that it performs a delayed rotation, by the inertia thereof, with respect to said retaining member when the acceleration of the webbing caused by changes in the extracting speed thereof exceeds a predetermined value.

* * * * *